(12) United States Patent
Pietrantoni et al.

(10) Patent No.: US 7,993,735 B1
(45) Date of Patent: Aug. 9, 2011

(54) INTERMEDIATE TRANSFER MEMBER AND METHOD OF MANUFACTURE

(75) Inventors: Dante M. Pietrantoni, Rochester, NY (US); Jin Wu, Pittsford, NY (US); Jonathan H. Herko, Walworth, NY (US); Lanhui Zhang, Webster, NY (US); Lin Ma, Pittsford, NY (US); Francisco J. Lopez, Rochester, NY (US); Kyle B. Tallman, Farmington, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 12/758,917

(22) Filed: Apr. 13, 2010

(51) Int. Cl.
*B32B 9/00* (2006.01)

(52) U.S. Cl. ........ 428/220; 264/104; 264/105; 264/216; 264/331.19; 428/323; 428/327; 428/328; 428/336; 428/473.5

(58) Field of Classification Search .................. 428/323, 428/327, 328, 336, 473.5, 220; 264/104, 264/105, 216, 331.19; 427/385.5
See application file for complete search history.

(56) References Cited

U.S. PATENT DOCUMENTS 5,922,440 A    7/1999 Schlueter, Jr. et al.
(Continued)

OTHER PUBLICATIONS

U.S. Appl. No. 12/758,923, filed Apr. 13, 2010, Office Action dated May 11, 2011.

*Primary Examiner* — D. S. Nakarani
(74) *Attorney, Agent, or Firm* — Hoffman Warnick LLC

(57) ABSTRACT

The present teachings provide an intermediate transfer member. The intermediate transfer member includes a polyimide polymer having the formula:

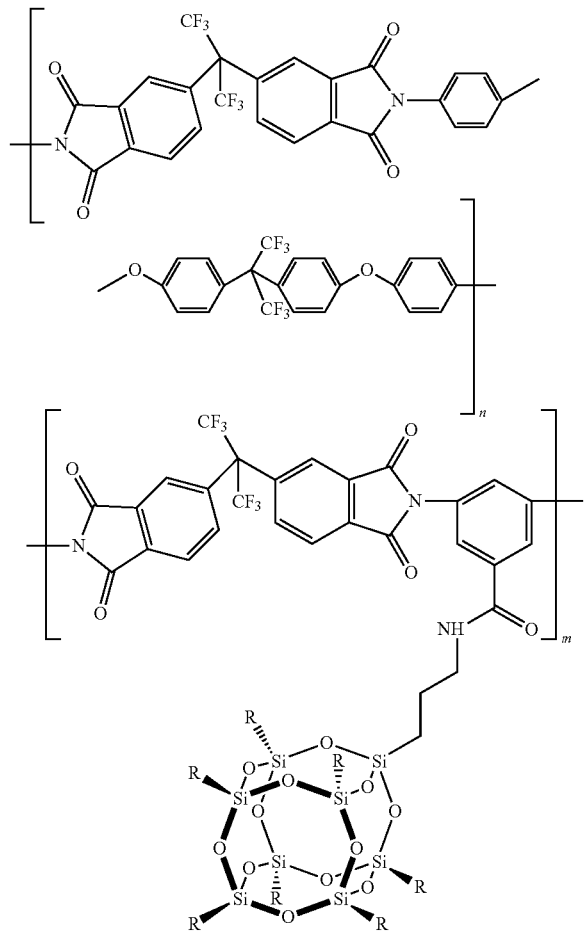

wherein R is alkyl or aryl and the like and mixtures thereof; and n and m are the mole percent of the repeating unit.

19 Claims, 2 Drawing Sheets

U.S. PATENT DOCUMENTS

| | | |
|---|---|---|
| 6,768,967 B2 | 7/2004 | Johnson et al. |
| 6,820,738 B2 | 11/2004 | Hara et al. |
| 7,565,100 B2 | 7/2009 | Namba |
| 2010/0056666 A1* | 3/2010 | Poe et al. ..................... 523/135 |

* cited by examiner

INTERMEDIATE TRANSFER MEMBER AND METHOD OF MANUFACTURE

BACKGROUND

1. Field of Use

This disclosure is directed to an image-forming apparatus and an intermediate transfer member.

2. Background

Image-forming apparatuses in which a color or black and white image is formed by using an intermediate transfer member to electrostatically transfer toner are well known. When an image is formed on a sheet of paper in a color image-forming apparatus using such an intermediate transfer member, four color images in yellow, magenta, cyan and black respectively are generally first transferred sequentially from an image carrier such as a photoreceptor and superimposed on the intermediate transfer member (the primary transfer). This full color image is then transferred to a sheet of paper in a single step (the secondary transfer). In a black and white image-forming apparatus, a black image is transferred from the photoreceptor, superimposed on an intermediate transfer member, and then transferred to a sheet of paper.

An intermediate transfer member is required in an image-forming apparatus.

SUMMARY

According to various embodiments, the present teachings provide an intermediate transfer member which includes a polyimide polymer having the formula:

wherein R is alkyl or aryl and mixtures thereof; and n and m are the mole percent of the repeating unit, and n is from about 50 to about 99 mole percent, and m is from about 50 to about 1 mole percent of the polyimide polymer.

A further aspect disclosed herein is a method of manufacturing an intermediate transfer member. The method includes dissolving a polyimide having a formula wherein R is alkyl or aryl and mixtures thereof; and n and m are the mole percent of the repeating unit, and n is from about 50 to about 99 mole percent, and m is from about 50 to about 1 mole percent of the polyimide polymer, in a solvent. The solution of the dissolved polyimide polymer is milled with a conductive additive to form a dispersion. The dispersion is coated on a substrate layer. The dispersion is then cured and separated from the substrate.

A further aspect disclosed herein is an intermediate transfer member that includes a polyhedral oligomeric silsesquioxane (POSS) fluoropolyimide polymer having a hexadecane contact angle of from about 20° to about 45° and a conductive additive of from about 2 to about 30 weight percent of the intermediate transfer member layer.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

It should be noted that some details of the figures have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Figure 1:
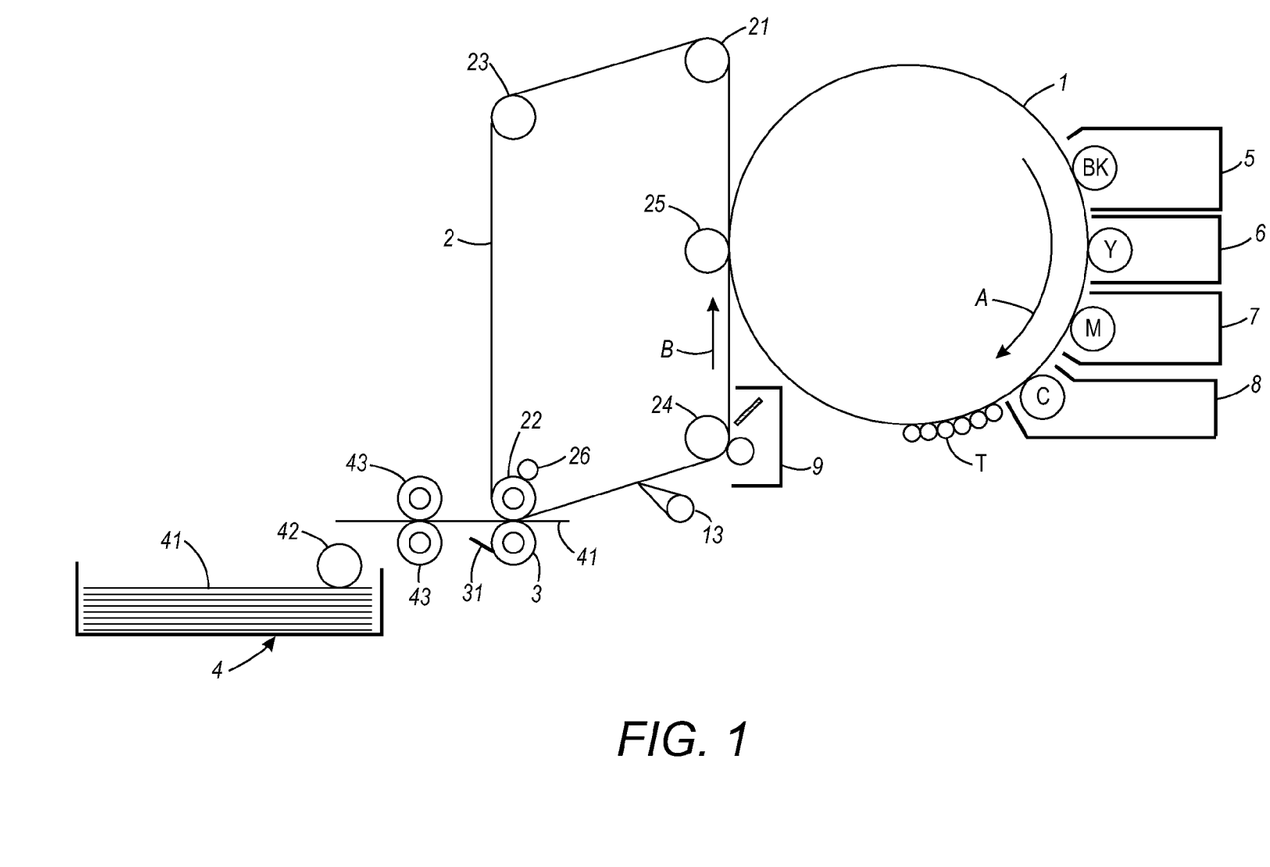
FIG. 1 is a schematic illustration of an image apparatus.

Referring to FIG. 1, an image-forming apparatus includes an intermediate transfer member as described in more detail below. The image-forming apparatus is an image-forming apparatus of an intermediate transfer system comprising a first transfer unit for transferring the toner image formed on the image carrier onto the intermediate transfer member by primary transfer, and a second transfer unit for transferring the toner image transferred on the intermediate transfer member onto the transfer material by secondary transfer. Also in the image-forming apparatus, the intermediate transfer member may be provided as a transfer-conveying member for conveying the transfer material in the transfer region for transferring the toner image onto the transfer material. Having the intermediate transfer member that transfers images of high quality and that remains stable for a long period is required.

The image-forming apparatus described herein is not particularly limited as far as it is an image-forming apparatus of intermediate transfer type, and examples include an ordinary monochromatic image-forming apparatus accommodating only a monochromatic color in the developing device, a color image-forming apparatus for repeating primary transfer of the toner image carried on the image carrier sequentially on the intermediate transfer member, and a tandem color image-forming apparatus having plural image carriers with developing units of each color disposed in series on the intermediate transfer member. More specifically, it may arbitrarily comprise an image carrier, a charging unit for uniformly charging the surface of the image carrier, an exposure unit for exposing the surface of the intermediate transfer member and forming an electrostatic latent image, a developing unit for developing the latent image formed on the surface of the image carrier by using a developing solution and forming a toner image, a fixing unit for fixing the toner unit on the transfer material, a cleaning unit for removing toner and foreign matter sticking to the image carrier, a destaticizing unit for removing the electrostatic latent image left over on the surface of the image carrier, and others by known methods as required.

As the image carrier, a known one may be used. As its photosensitive layer, an organic system, amorphous silicon, or other known material may be used. In the case of the image carrier of cylindrical type, it is obtained by a known method of molding aluminum or aluminum alloy by extrusion, and processing the surface. A belt form image carrier may also used.

The charging unit is not particularly limited, and known chargers may be used, such as a contact type charger using conductive or semiconductive roller, brush, film and rubber blade, scorotron charger or corotron charge making use of corona discharge, and others. Above all, the contact type charging unit is preferred from the viewpoint of excellent, charge compensation capability. The charging unit usually applies DC current to the electrophotographic photosensitive material, but AC current may be further superposed.

The exposure unit is not particularly limited, and, for example, an optical system device may be used, which exposes a desired image on the surface of the electrophotographic photosensitive material by using a light source such as semiconductor laser beam, light emitting diode (LED) beam, liquid crystal shutter beam or the like, or through a polygonal mirror from such light source.

The developing unit may be properly selected depending on the purpose, and, for example, a known developing unit for developing by using one-pack type developing solution or two-pack type developing solution, with or without contact, using brush and roller may be used.

The first transfer unit includes known transfer chargers such as a contact type transfer charger using member, roller, film and rubber blade, and scorotron transfer charger or corotron transfer charger making use of corona discharge. Above all, the contact type transfer charger provides excellent transfer charge compensation capability. Aside from the transfer charger, a peeling type charger may be also used together.

The second transfer unit may be same as the first transfer unit such as a contact type transfer charger using transfer roller and others, scorotron transfer charger and corotron transfer charger. By pressing firmly by the transfer roller of the contact type transfer charger, the image transfer stage can be maintained. Further, by pressing the transfer roller or the contact type transfer charger at the position of the roller for guiding the intermediate transfer member, the action of moving the toner image from the intermediate transfer member to the transfer material may be done.

As the photo destaticizing unit, for example, a tungsten lamp or LED may be used, and the light quality used in the photo destaticizing process may include white light of tungsten lamp and red light of LED. As the irradiation light intensity in the photo destaticizing process, usually the output is set to be about several times to 30 times of the quantity of light showing the half exposure sensitivity of the electrophotographic photosensitive material.

The fixing unit is not particularly limited, and any known fixing unit may be used, such as heat roller fixing unit and oven fixing unit.

The cleaning unit is not particularly limited, and any known cleaning device may be used.

A color image-forming apparatus for repeating primary transfer is shown schematically in FIG. 1. The image-forming apparatus shown in FIG. 1 includes a photosensitive drum 1 as image carrier, a transfer member 2 as an intermediate transfer member such as a transfer belt, a bias roller 3 as transfer electrode, a tray 4 for feeding paper as transfer material, a developing device 5 by BK (black) toner, a developing device 6 by Y (yellow) toner, a developing device 7 by M (magenta) toner, a developing device 8 by C (cyan) toner, a member cleaner 9, a peeling pawl 13, rollers 21, 23 and 24, a backup roller 22, a conductive roller 25, an electrode roller 26, a cleaning blade 31, a block of paper 41, a pickup roller 42, and a feed roller 43.

In the image-forming apparatus shown in FIG. 1, the photosensitive drum 1 rotates in the direction of arrow A, and the surface of the charging device (not shown) is uniformly charged. On the charged photosensitive drum 1, an electrostatic latent image of a first color (for example, BK) is formed by an image writing device such as a laser writing device. This electrostatic latent image is developed by toner by the developing device 5, and a visible toner image T is formed. The toner image T is brought to the primary transfer unit comprising the conductive roller 25 by rotation of the photosensitive drum 1, and an electric field of reverse polarity is applied to the toner image T from the conductive roller 25. The toner image T is electrostatically adsorbed on the transfer member 2, and the primary transfer is executed by rotation of the transfer member 2 in the direction of arrow B.

Similarly, a toner image of a second color, a toner image of a third color and a toner image of a fourth color are sequentially formed, and overlaid on the transfer member 2, and a multi-layer toner image is formed.

The multi-layer toner image transferred on the transfer member 2 is brought to the secondary transfer unit comprising the bias roller 3 by rotation of the transfer member 2. The secondary transfer unit comprises the bias roller 3 disposed at the surface side carrying the toner image of the transfer member 2, backup roller 22 disposed to face the bias roller 3 from the back side of the transfer member 2, and electrode roller 26 rotating in tight contact with the backup roller 22.

The paper 41 is taken out one by one from the paper block accommodated in the paper tray 4 by means of the pickup roller 42, and is fed into the space between the transfer member 2 and bias roller 3 of the secondary transfer unit by means of the feed roller 43 at a specified timing. The fed paper 41 is conveyed under pressure between the bias roller 3 and backup roller 22, and the toner image carried on the transfer belt 2 is transferred thereon by rotation of the transfer member 2.

The paper 41 on which the toner image is transferred, is peeled off from the transfer member 2 by operating the peeling pawl 13 at the retreat position until the end of primary transfer of the final toner image, and conveyed to the fixing device (not shown). The toner image is fixed by pressing and heating, and a permanent image is formed. After transfer of the multi-layer toner image onto the paper 41, the transfer member 2 is cleaned by the cleaner 9 disposed at the downstream side of the secondary transfer unit to remove the residual toner, and is ready for next transfer. The bias roller 3 is provided so that the cleaning blade 31 made of polyurethane or the like may be always in contact, and toner particles, paper dust and other foreign matter sticking by transfer are removed.

In the case of transfer of a monochromatic image, the toner image T after primary transfer is immediately sent to the secondary transfer process, and is conveyed to the fixing device, but in the case of transfer of multi-color image by combination of plural colors, the rotation of the transfer member 2 and photosensitive drum 1 is synchronized so that the toner images of plural colors may coincide exactly in the primary transfer unit, and deviation of toner images of colors is prevented. In the secondary transfer unit, by applying a voltage of the same polarity (transfer voltage) as the polarity of the toner to the electrode roller 26 tightly contacting with the backup roller 22 disposed oppositely through the bias roller 3 and transfer member 2, the toner image is transferred onto the paper 41 by electrostatic repulsion. Thus, the image is formed.

The intermediate transfer member 2 can be of any suitable configuration. Examples of suitable configurations include a sheet, a film, a web, a foil, a strip, a coil, a cylinder, a drum, an endless mobius strip, a circular disc, a belt including an endless belt, an endless seamed flexible belt, an endless seamless flexible belt, an endless belt having a puzzle cut seam, and the like. In FIG. 1, the transfer member 2 is depicted as a belt.

In an image on image transfer, the color toner images are first deposited on the photoreceptor and all the color toner images are then transferred simultaneously to the intermediate transfer member. In a tandem transfer, the toner image is transferred one color at a time from the photoreceptor to the same area of the intermediate transfer member. Both embodiments are included herein.

Transfer of the developed image from the photoconductive member to the intermediate transfer member and transfer of the image from the intermediate transfer member to the substrate can be by any suitable technique conventionally used in electrophotography, such as corona transfer, pressure transfer, bias transfer, and combinations of those transfer means, and the like.

The intermediate transfer member can be of any suitable configuration. Examples of suitable configurations include a sheet, a film, a web, a foil, a strip, a coil, a cylinder, a drum, an endless strip, a circular disc, a drelt (a cross between a drum and a belt), a belt including an endless belt, an endless seamed flexible belt, and an endless seamed flexible imaging belt.

Figure 2:
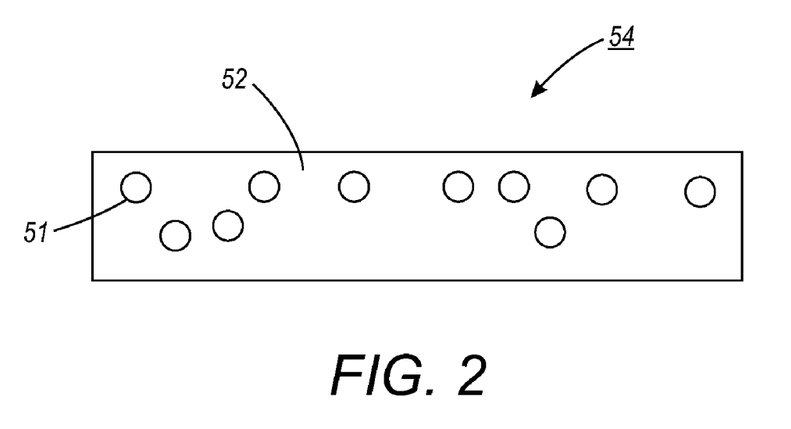
FIG. 2 is a schematic representation of an embodiment disclosed herein.

In an embodiment shown in FIG. 2, the intermediate transfer member 54 is in the form of a film in a one layer configuration. The intermediate transfer member 54 includes a single layer of a polyhedral oligomeric silsesquioxane (POSS) fluoropolyimide. The single layer further contains conductive filler particles 51. The POSS fluoropolyimide has a hexadecane contact angle of from about 20 degrees to about 45 degrees or from about 25 degrees to about 40 degrees.

An example of a (POSS) fluoropolyimide includes one having the following chemical structure:

wherein R is alkyl such as isobutyl, isooctyl, cyclohexyl, cyclopentyl, methyl, or aryl such as phenyl, dodecaphenyl, phenethyl, phenethylisobutyl, and the like and mixtures thereof; and n and m are the mole percent of the repeating unit, and n is from about 50 to about 99 mole percent or from about 60 to about 80 mole percent, and m is from about 50 to about 1 mole percent or from about 40 to about 20 mole percent of the polyimide polymer.

In embodiments, the POSS fluoropolyimide has a $T_g$ of from about 200 to about 340° C., or from about 240 to about 300° C. In addition, the POSS has a number average molecular weight of from about 10,000 to 200,000, or from about 50,000 to about 100,000, and a weight average molecular weight of from about 50,000 to about 500,000, or from about 100,000 to about 300,000.

An example of a commercially available POSS fluoropolyimide is CORIN® XLS available from ManTech International Corporation. It possesses excellent attributes such as high $T_g$ of about 266° C. The number average molecular weight was determined to be about 86,000, and the weight average molecular weight was about 231,000. The POSS fluoropolyimide is soluble in common organic solvents such as tetrahydrofuran (THF), methyl ethyl ketone (MEK), methyl isobutyl ketone (MIBK), N,N'-dimethylformamide (DMF), N,N'-dimethylacetamide (DMAc) or N-methylpyrrolidone (NMP). In contrast, common polyimide is only soluble in high boiling point solvents such as DMF, DMAc or NMP.

Certain electrically conductive particles 51 dispersed in the POSS fluoropolyimide layer 52, in embodiments, decrease the resistivity into the desired surface resistivity range of from about $10^9$ ohms/square, to about $10^{13}$ ohms/square, or from about $10^{10}$ ohms/square, to about $10^{12}$ ohms/square. The volume resistivity is from about $10^8$ ohm-cm to about $10^{12}$ ohm-cm, or from about $10^9$ ohm-cm to about $10^{11}$ ohm-cm. The resistivity can be provided by varying the concentration of the conductive particles.

Examples of conductive fillers include carbon blacks such as carbon black, graphite, acetylene black, fluorinated carbon black, and the like; metal oxides and doped metal oxides, such as tin oxide, antimony dioxide, antimony-doped tin oxide, titanium dioxide, indium oxide, zinc oxide, indium oxide, indium-doped tin trioxide, and polymers such as polyaniline and polythiophene, and mixtures thereof. The conductive filler may be present in an amount of from about 1 to about 60 and or from about 3 to about 40, or from about 5 to about 20 parts by weight of total solids of the intermediate transfer member.

Carbon black surface groups can be formed by oxidation with an acid or with ozone, and where there is absorbed or chemisorbed oxygen groups from, for example, carboxylates, phenols, and the like. The carbon surface is essentially inert to most organic reaction chemistry except primarily for oxidative processes and free radical reactions.

The conductivity of carbon black is primarily dependent on surface area and its structure, generally, the higher the surface area and the higher the structure, the more conductive the carbon black. Surface area is measured by the B.E.T. nitrogen surface area per unit weight of carbon black, and is the measurement of the primary particle size. The surface area of the carbon black described herein is from about 460 m²/g to about 35 m²/g. Structure is a complex property that refers to the morphology of the primary aggregates of carbon black. It is a measure of both the number of primary particles comprising primary aggregates, and the manner in which they are "fused" together. High structure carbon blacks are characterized by aggregates comprised of many primary particles with considerable "branching" and "chaining", while low structure carbon blacks are characterized by compact aggregates comprised of fewer primary particles. Structure is measured by dibutyl phthalate (DBP) absorption by the voids within carbon blacks. The higher the structure, the more the voids, and the higher the DBP absorption.

Examples of carbon blacks selected as the conductive component for the intermediate transfer member (ITM) include VULCAN® carbon blacks, REGAL® carbon blacks, MONARCH® carbon blacks and BLACK PEARLS® carbon blacks available from Cabot Corporation. Specific examples of conductive carbon blacks are BLACK PEARLS® 1000 (B.E.T. surface area=343 m²/g, DBP absorption=1.05 ml/g), BLACK PEARLS® 880 (B.E.T. surface area=240 m²/g, DBP absorption=1.06 ml/g), BLACK PEARLS® 800 (B.E.T. surface area=230 m²/g, DBP absorption=0.68 ml/g), BLACK PEARLS® L (B.E.T. surface area=138 m²/g, DBP absorption=0.61 ml/g), BLACK PEARLS® 570 (B.E.T. surface area=110 m²/g, DBP absorption=1.14 ml/g), BLACK PEARLS® 170 (B.E.T. surface area=35 m²/g, DBP absorption=1.22 ml/g), VULCAN® XC72 (B.E.T. surface area=254 m²/g, DBP absorption=1.76 ml/g), VULCAN® XC72R (fluffy form of VULCAN® XC72), VULCAN® XC605, VULCAN® XC305, REGAL® 660 (B.E.T. surface area=112 m²/g, DBP absorption=0.59 ml/g), REGAL® 400

(B.E.T. surface area=96 m$^2$/g, DBP absorption=0.69 ml/g), REGAL® 330 (B.E.T. surface area=94 m$^2$/g, DBP absorption=0.71 ml/g), MONARCH® 880 (B.E.T. surface area=220 m$^2$/g, DBP absorption=1.05 ml/g, primary particle diameter=16 nanometers), and MONARCH® 1000 (B.E.T. surface area=343 m$^2$/g, DBP absorption=1.05 ml/g, primary particle diameter=16 nanometers); Channel carbon blacks available from Evonik-Degussa; Special Black 4 (B.E.T. surface area=180 m$^2$/g, DBP absorption=1.8 ml/g, primary particle diameter=25 nanometers), Special Black 5 (B.E.T. surface area=240 m$^2$/g, DBP absorption=1.41 ml/g, primary particle diameter=20 nanometers), Color Black FW1 (B.E.T. surface area=320 m$^2$/g, DBP absorption=2.89 ml/g, primary particle diameter=13 nanometers), Color Black FW2 (B.E.T. surface area=460 m$^2$/g, DBP absorption=4.82 ml/g, primary particle diameter=13 nanometers), and Color Black FW200 (B.E.T. surface area=460 m$^2$/g, DBP absorption=4.6 ml/g, primary particle diameter=13 nanometers).

Further examples of conductive fillers include doped metal oxides. Doped metal oxides include antimony doped tin oxide, aluminum doped zinc oxide, antimony doped titanium dioxide, similar doped metal oxides, and mixtures thereof.

Suitable antimony doped tin oxides include those antimony doped tin oxides coated on an inert core particle (e.g., ZELEC®ECP-S, M and T) and those antimony doped tin oxides without a core particle (e.g., ZELEC®ECP-3005-XC and ZELEC®ECP-3010-XC, ZELEC® is a trademark of DuPont Chemicals Jackson Laboratories, Deepwater, N.J.). The core particle may be mica, TiO$_2$ or acicular particles having a hollow or a solid core.

In another embodiment, the electrically conductive particles include antimony doped tin oxide coated on an inert core particle (e.g., ZELEC® ECP-S, M and T). ZELEC® is a trademark of DuPont Chemicals Jackson Laboratories, Deepwater, N.J. The core particle may be mica, TiO$_2$ or acicular particles having a hollow or a solid core.

In another embodiment, antimony doped tin oxide particles are prepared by densely layering a thin layer of antimony doped tin oxide onto the surface of a silica shell or silica-based particle, wherein the shell, in turn, has been deposited onto a core particle. The crystallites of the conductor are dispersed in such a fashion so as to form a dense conductive surface on the silica layer. This provides optimal conductivity. Also, the particles are fine enough in size to provide adequate transparency. The silica may either be a hollow shell or layered on the surface of an inert core, forming a solid structure. Forms of antimony doped tin oxide are commercially available under the tradename ZELEC® ECP (electroconductive powders) from DuPont Chemicals Jackson Laboratories, Deepwater, N.J. Particularly preferred antimony doped tin oxides are ZELEC® ECP 1610-S, ZELEC® ECP 2610-S, ZELEC® ECP 3610-S, ZELEC® ECP 1703-S, ZELEC® ECP 2703-S, ZELEC® ECP 1410-M, ZELEC® ECP 3005-XC, ZELEC® ECP 3010-XC, ZELEC® ECP 1410-T, ZELEC® ECP 3410-T, ZELEC® ECP-S-X1, and the like. Three commercial grades of ZELEC® ECP powders are preferred and include an acicular, hollow shell product (ZELEC® ECP-S), an equiaxial titanium dioxide core product (ZELEC ECP-T), and a plate shaped mica core product (ZELEC® ECP-M).

The intermediate transfer member containing a POSS fluoropolymer may include additional polymers such as polyimide polymer including a polyimide, a polyamideimide or a polyetherimide and the like and mixtures thereof, present in an amount of from about 1 to about 95, or from about 10 to about 60 parts by weight of total solids of the intermediate transfer member.

Polyimide examples that can be used in the outer layer are inclusive of known low temperature, and rapidly cured polyimide polymers, such as VTEC™ PI 1388, 080-051, 851, 302, 203, 201, and PETI-5, all available from Richard Blaine International, Incorporated, Reading, Pa. These thermosetting polyimides can be cured at temperatures of from about 180 to about 260° C. over a short period of time, such as from about 10 to about 120 minutes, or from about 20 to about 60 minutes; possess a number average molecular weight of from about 5,000 to about 500,000, or from about 10,000 to about 100,000, and a weight average molecular weight of from about 50,000 to about 5,000,000, or from about 100,000 to about 1,000,000. Also, other thermosetting polyimides that can be cured at temperatures of above 300° C. include PYRE M.L® RC-5019, RC 5057, RC-5069, RC-5097, RC-5053, and RK-692, all commercially available from Industrial Summit Technology Corporation, Parlin, N.J.; RP-46 and RP-50, both commercially available from Unitech LLC, Hampton, Va.; DURIMIDE® 100, commercially available from FUJIFILM Electronic Materials U.S.A., Inc., North Kingstown, R.I.; and KAPTON® HN, VN and FN, all commercially available from E.I. DuPont, Wilmington, Del.

Examples of polyamideimides that can be used in the intermediate transfer member outer layer are VYLOMAX® HR-11NN (15 weight percent solution in N-methylpyrrolidone, $T_g$=300° C., and $M_w$=45,000), HR-12N2 (30 weight percent solution in N-methylpyrrolidone/xylene/methyl ethyl ketone=50/35/15, $T_g$=255° C., and $M_w$=8,000), HR-13NX (30 weight percent solution in N-methylpyrrolidone/xylene=67/33, $T_g$=280° C., and $M_w$=10,000), HR-15ET (25 weight percent solution in ethanol/toluene=50/50, $T_g$=260° C., and $M_w$=10,000), HR-16NN (14 weight percent solution in N-methylpyrrolidone, $T_g$=320° C., and $M_w$=100,000), all commercially available from Toyobo Company of Japan, and TORLON® AI-10 ($T_g$=272° C.), commercially available from Solvay Advanced Polymers, LLC, Alpharetta, Ga.

Examples of polyetherimides that can be used in the intermediate transfer member outer layer are ULTEM® 1000 ($T_g$=210° C.), 1010 ($T_g$=217° C.), 1100 ($T_g$=217° C.), 1285, 2100 ($T_g$=217° C.), 2200 ($T_g$=217° C.), 2210 ($T_g$=217° C.), 2212 ($T_g$=217° C.), 2300 ($T_g$=217° C.), 2310 ($T_g$=217° C.), 2312 ($T_g$=217° C.), 2313 ($T_g$=217° C.), 2400 ($T_g$=217° C.), 2410 ($T_g$=217° C.), 3451 ($T_g$=217° C.), 3452 ($T_g$=217° C.), 4000 ($T_g$=217° C.), 4001 ($T_g$=217° C.), 4002 ($T_g$=217° C.), 4211 ($T_g$=217° C.), 8015, 9011 ($T_g$=217° C.), 9075, and 9076, all commercially available from Sabic Innovative Plastics.

Also, polyimides that may be selected as the intermediate transfer member layer may be prepared as fully imidized polymers which do not contain any "amic" acid, and do not require high temperature cure to convert them to the imide form. A typical polyimide of this type may be prepared by reacting di-(2,3-dicarboxyphenyl)-ether dianhydride with 5-amino-1-(p-aminophenyl)-1,3,3-trimethylindane. This polymer is available as Polyimide XU 218 sold by Ciba-Geigy Corporation, Ardsley, N.Y. Other fully imidized polyimides are available from Lenzing Corporation in Dallas, Tex., and are sold as Lenzing P83 polyimide and by Mitsui Toatsu Chemicals, New York, N.Y. sold as Larc-TPI.

The intermediate transfer member layer has a glass transition temperature of from about 200° C. to about 340° C., or from about 240° C. to about 300° C., or about 266° C.

The thickness of the intermediate transfer member is from about 30 microns to about 400 microns, or from about 50 microns to about 200 microns, or from about 70 microns to about 150 microns.

A method of manufacturing the intermediate transfer member includes dissolving a POSS fluoropolyimide having a formula wherein R is alkyl such as isobutyl, isooctyl, cyclohexyl, cyclopentyl, methyl, or aryl such as phenyl, dodecaphenyl, phenethyl, phenethylisobutyl, and the like and mixtures thereof; and n and m are the mole percent of the repeating unit, and n is from about 50 to about 99 mole percent or from about 60 to about 80 mole percent, and m is from about 50 to about 1 mole percent or from about 40 to about 20 mole percent of the polyimide polymer, in a solvent. The solvent can be any solvent that dissolved the low temperature cure polyimide. Examples include tetrahydrofuran (THF), methyl ethyl ketone (MEK), methyl isobutyl ketone (MIBK), N,N'-dimethylformamide (DMF), N,N'-dimethylacetamide (DMAc) or N-methylpyrrolidone (NMP) and the like and mixtures thereof. The solution of the dissolved POSS fluoropolyimide is milled with a conductive additive to form a dispersion. The dispersion is coated on a substrate such as polyethylene naphthalate (PEN), aluminum, or stainless steel and cured. The cured layer is separated from the substrate.

The dispersion is coated on the substrate layer in any suitable known manner. Typical techniques for coating such materials on the substrate layer include flow coating, liquid spray coating, dip coating, wire wound rod coating, fluidized bed coating, powder coating, electrostatic spraying, sonic spraying, blade coating, molding, laminating, and the like.

Additives and additional fillers may be present in any of the above-described layers.

Specific embodiments will now be described in detail. These examples are intended to be illustrative, and not limited to the materials, conditions, or process parameters set forth in these embodiments. All parts are percentages by solid weight unless otherwise indicated.

EXAMPLES

Experimentally, the CORIN® XLS POSS fluoropolyimide (the number average molecular weight was determined to be about 86,000, the weight average molecular weight was about 231,000, and the glass transition temperature was about 266° C., available from ManTech SRS Technologies, Huntsville, Ala.) was dissolved in THF, and then mixed with carbon black FW-1 (B.E.T. surface area of 320 m²/g, DBP absorption of 2.89 ml/g, primary particle diameter of 13 nanometers, from Evonik) at a weigh ratio of 95/5 with a solid content about 20 wt %. The mixture was ball milled to obtain the intermediate transfer belt (ITB) coating dispersion. The dispersion was coated on a PEN substrate, and then dried at 80° C. for 20 minutes and separated from the PEN substrate. The flat free-standing intermediate transfer device was obtained with a thickness of about 50 microns, and the test results are shown in Table 1.

TABLE 1

| | Surface resistivity (ohm/square) | Young's Modulus (MPa) |
|---|---|---|
| CORIN ® XLS/color black FW-1 = 95/5 | $5.9 \times 10^9$ | 2,700 |

The above intermediate transfer belt member or device was measured for surface resistivity (averaging four to six measurements at varying spots, 72° F./65 percent room humidity) using a High Resistivity Meter (Hiresta-Up MCP-HT450 available from Mitsubishi Chemical Corp.). With proper amount of carbon black such as 5 weight percent in the intermediate transfer member, the surface resistivity can be adjusted in the functional range of from about $10^9$ to about $10^{13}$ ohm/square.

The above intermediate transfer belt member or device of CORIN® XLS/color black FW-1=95/5 was measured for Young's modulus following the ASTM D882-97 process. The sample (0.5 inch×12 inch) was placed in the measurement apparatus, the Instron Tensile Tester, and then elongated at a constant pull rate until breaking During this time, the instrument recorded the resulting load versus sample elongation. The modulus was calculated by taking any point tangential to the initial linear portion of this curve and dividing the tensile stress by the corresponding strain. The tensile stress was given by load divided by the average cross sectional area of the test specimen.

The modulus of the resulting intermediate transfer member was about 2,700 MPa. The low cure intermediate transfer member described herein provides a lower cost manufacturing option.

The disclosed POSS fluoropolyimide is soluble in THF, a very unique feature for polyimide materials, noting most polyimides are only soluble in high boilers such as DMF and NMP. Thus, the disclosed POSS fluoropolyimide ITB would consume much less energy and time to produce.

Since hexadecane is a better simulation of toner or ink, it is widely used for measuring contact angle. Higher the hexadecane contact angle, less adhesion and better release of the toner or ink. The contact angle data were summarized in Table 2.

TABLE 2

| | Water contact angle | Hexadecane contact angle |
|---|---|---|
| polyimide ITB | 75° | 5° |
| fluoropolyimide ITB disclosed in USSNs 12/635,110 | 94° | 15° |
| POSS fluoropolyimide ITB disclosed herein | 104° | 35° |
| PTFE layer | 120° | 45° |

The surface property of the disclosed POSS fluoropolyimide ITB was most close to that of PTFE. The POSS fluoropolyimide exhibited higher contact angle, especially hexadecane contact angle than the fluoropolyimide ITB as in U.S. Ser. Nos. 12/635,110 and 12/635,101, and of course much higher than the polyimide ITB.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. An intermediate transfer member comprising:
a first polyimide polymer having the formula:

wherein R is alkyl or aryl and mixtures thereof; and n is from about 50 to about 99 mole percent, and said m is from about 50 to about 1 mole percent of said polyimide polymer and a conductive additive comprising carbon black in an amount of from about 1 weight percent to about 60 weight percent of the intermediate transfer member.

2. The intermediate transfer member of claim 1, wherein said alkyl is selected from a group consisting of isobutyl, isooctyl, cyclohexyl, cyclopentyl, and methyl; and said aryl is selected from a group consisting of phenyl, dodecaphenyl, phenethyl, and phenethylisobutyl.

3. The intermediate transfer member of claim 1, further comprising a second conductive additive.

4. The intermediate transfer member of claim 3 wherein the second conductive additive is selected from the group consisting of tin oxide, antimony dioxide, antimony-doped tin oxide, titanium dioxide, indium oxide, zinc oxide, indium oxide, indium-doped tin trioxide, polyaniline and polythiophene.

5. The intermediate transfer member of claim 1, further comprising a second polyimide polymer.

6. The intermediate transfer member of claim 1, wherein said polymer comprises a surface resistivity of from about $10^9$ ohms/square to about $10^{13}$ ohms/square.

7. The intermediate transfer member of claim 1, wherein said polymer comprises a volume resistivity of from about $10^8$ ohm-cm to about $10^{12}$ ohm-cm.

8. The intermediate transfer member of claim 1, wherein said polymer comprises a thickness of from about 30 to about 400 microns.

9. The intermediate transfer member of claim 1, wherein said polymer comprises a hexadecane contact angle of from about 20 degrees to about 45 degrees.

10. The intermediate transfer member of claim 1 wherein said polymer comprises a glass transition temperature of from about 200° C. to about 340° C.

11. An intermediate transfer member comprising:

a polyhedral oligomeric silsesquioxane (POSS) fluoropolyimide polymer having a hexadecane contact angle of from about 20° to about 45° and a conductive additive comprising carbon black of from about 5 to about 20 weight percent of the member.

12. The intermediate transfer member of claim 11 wherein the POSS fluoropolyimide polymer comprises the formula:

wherein R is alkyl or aryl and mixtures thereof; and n and m are the mole percent of the repeating unit.

13. The intermediate transfer member of claim 11, further comprising a second polyimide polymer.

14. The intermediate transfer member of claim 11 comprising a surface resistivity of from about $10^9$ ohms/square to about $10^{13}$ ohms/square.

15. A method of manufacturing an intermediate transfer member comprising:

dissolving a polyimide having a formula wherein R is alkyl or aryl and mixtures thereof; and n is from about 50 to about 99 mole percent, and m is from about 50 to about 1 mole percent of said polyimide, in a solvent;

milling the dissolved polyimide with a conductive additive comprising carbon black to form a dispersion;

coating the dispersion on a substrate layer to form an intermediate transfer member; and curing the dispersion; and separating the intermediate transfer member from the substrate.

16. The method of claim 15 wherein the solvent is selected from the group consisting of tetrahydrofuran, methyl ethyl ketone, methyl isobutyl ketone, N,N'-dimethylformamide, N,N'-dimethylacetamide, N-methylpyrrolidone and mixture thereof.

17. The method of claim 15 wherein the alkyl is selected from a group consisting of isobutyl, isooctyl, cyclohexyl, cyclopentyl, and methyl; the aryl is selected from a group consisting of phenyl, dodecaphenyl, phenethyl, and phenethylisobutyl.

18. The method of claim 15 wherein the carbon black comprises from about 1 to about 60 weight percent of the total solids of the dispersion.

19. The method of claim 15 wherein the substrate is selected from the group consisting of polyethylene naphthalate, aluminum, glass and stainless steel.

* * * * *